(12) United States Patent
Murar et al.

(10) Patent No.: US 10,284,822 B2
(45) Date of Patent: May 7, 2019

(54) SYSTEM FOR ENHANCING THE VISIBILITY OF A GROUND SURFACE ADJACENT TO A LAND VEHICLE

(71) Applicant: JVIS-USA, LLC, Sterling Heights, MI (US)

(72) Inventors: Jason T. Murar, Macomb, MI (US); Darius J. Preisler, Macomb, MI (US); David R. Syrowik, Milford, MI (US)

(73) Assignee: JVIS-USA, LLC, Sterling Heights, MI (US)

( * ) Notice: Subject to any disclaimer, the term of this patent is extended or adjusted under 35 U.S.C. 154(b) by 1 day.

(21) Appl. No.: 15/271,412

(22) Filed: Sep. 21, 2016

(65) Prior Publication Data
US 2017/0237945 A1  Aug. 17, 2017

Related U.S. Application Data

(63) Continuation-in-part of application No. 15/090,766, filed on Apr. 5, 2016, now Pat. No. 9,704,397, and a
(Continued)

(51) Int. Cl.
*H04N 7/18* (2006.01)
*B60R 1/12* (2006.01)
(Continued)

(52) U.S. Cl.
CPC ............. *H04N 7/183* (2013.01); *B60K 35/00* (2013.01); *B60Q 1/24* (2013.01); *B60R 1/1207* (2013.01); *G06K 9/00791* (2013.01); *B60K 2350/2013* (2013.01); *B60K 2350/2052* (2013.01); *B60K 2350/357* (2013.01); *B60K 2350/924* (2013.01);
(Continued)

(58) Field of Classification Search
CPC ...................... G06K 9/00791; G06K 9/00805
See application file for complete search history.

(56) References Cited

U.S. PATENT DOCUMENTS 4,238,778 A   12/1980  Ohsumi
6,222,461 B1   4/2001  Hazen
(Continued)

OTHER PUBLICATIONS

Office Action, U.S. Appl. No. 15/045,862, filed Feb. 17, 2016, dated Mar. 23, 2017.
(Continued)

*Primary Examiner* — Daniell L Negron
(74) *Attorney, Agent, or Firm* — Brooks Kushman P.C.

(57) ABSTRACT

A system for enhancing the visibility of a ground surface adjacent to a land vehicle is provided. The system includes a mobile communication device, a hand-held communication device and control logic coupled to the mobile device and operative to determine if the hand-held device is an authorized device. An imaging assembly is supported on the vehicle to obtain an image of the ground surface. An image processor processes the image to detect an obstacle located on the ground surface. The control logic is operative to generate a display command signal. A display device is responsive to the signal to display in real time the detected obstacle or a welcome mat onto or adjacent the vehicle for enhanced viewing by an approaching pedestrian when the pedestrian carrying the authorized device is located within a predetermined range of the mobile device.

21 Claims, 6 Drawing Sheets

Related U.S. Application Data continuation-in-part of application No. 15/045,862, filed on Feb. 17, 2016, now Pat. No. 9,830,755.

(51) Int. Cl.
*B60Q 1/24* (2006.01)
*G06K 9/00* (2006.01)
*B60K 35/00* (2006.01)
*G07C 9/00* (2006.01)

(52) U.S. Cl.
CPC .. *B60K 2350/927* (2013.01); *B60K 2350/965* (2013.01); *B60R 2001/1253* (2013.01); *G07C 2009/00984* (2013.01)

(56) References Cited

U.S. PATENT DOCUMENTS

| | | | |
|---|---|---|---|
| 6,416,209 B1 | 7/2002 | Abbott | |
| 6,571,193 B1 | 5/2003 | Unuma et al. | |
| 6,822,580 B2 | 11/2004 | Ewing et al. | |
| 7,061,402 B1 | 6/2006 | Lawson | |
| 7,175,321 B1 | 2/2007 | Lopez | |
| 7,202,775 B2 | 4/2007 | Yezersky et al. | |
| 7,271,736 B2 | 9/2007 | Siegel et al. | |
| 7,538,687 B2 | 5/2009 | McKenna | |
| 8,350,721 B2 | 1/2013 | Carr | |
| 8,410,899 B2 | 4/2013 | Stevenson et al. | |
| 8,659,841 B2 | 2/2014 | Enomoto | |
| 8,694,195 B2 | 4/2014 | Lee et al. | |
| 8,788,152 B2 | 7/2014 | Reimann et al. | |
| 8,922,388 B2* | 12/2014 | Nykerk | B60Q 1/0023 340/901 |
| 8,983,717 B2 | 3/2015 | Pupin et al. | |
| 9,162,685 B2 | 10/2015 | Schindler et al. | |
| 9,199,608 B2 | 12/2015 | Newman et al. | |
| 9,201,270 B2 | 12/2015 | Fattal et al. | |
| 9,283,819 B2 | 3/2016 | Salter et al. | |
| 2005/0239436 A1 | 10/2005 | Bell et al. | |
| 2007/0159354 A1 | 7/2007 | Rosenberg | |
| 2007/0200672 A1 | 8/2007 | McBride et al. | |
| 2009/0174572 A1 | 7/2009 | Smith | |
| 2009/0243796 A1 | 10/2009 | Tieman | |
| 2009/0273941 A1 | 11/2009 | Englander et al. | |
| 2010/0171642 A1 | 7/2010 | Hassan et al. | |
| 2010/0253919 A1* | 10/2010 | Douglas | G03B 21/14 353/13 |
| 2010/0305779 A1 | 12/2010 | Hassan et al. | |
| 2010/0321945 A1 | 12/2010 | Lang et al. | |
| 2011/0018736 A1 | 1/2011 | Carr | |
| 2011/0187492 A1 | 8/2011 | Newman et al. | |
| 2011/0273671 A1* | 11/2011 | Chu | G03B 21/14 353/13 |
| 2011/0313619 A1 | 12/2011 | Washeleski et al. | |
| 2012/0249291 A1 | 10/2012 | Holcomb et al. | |
| 2012/0262540 A1 | 10/2012 | Rondinelli et al. | |
| 2012/0280528 A1 | 11/2012 | Dellock et al. | |
| 2013/0235149 A1 | 9/2013 | Tanaka et al. | |
| 2013/0311039 A1 | 11/2013 | Washeleski et al. | |
| 2013/0321581 A1 | 12/2013 | El-Ghoroury et al. | |
| 2014/0111856 A1 | 4/2014 | Brug et al. | |
| 2014/0146133 A1 | 5/2014 | Nikonov et al. | |
| 2014/0207343 A1 | 7/2014 | Kigoshi et al. | |
| 2014/0320823 A1 | 10/2014 | Ammar et al. | |
| 2014/0347361 A1 | 11/2014 | Alpaslan et al. | |
| 2015/0021887 A1 | 1/2015 | Hiraiwa et al. | |
| 2015/0033599 A1 | 2/2015 | Kunz et al. | |
| 2015/0036068 A1 | 2/2015 | Fattal et al. | |
| 2015/0077327 A1* | 3/2015 | Pisz | B60H 1/00642 345/156 |
| 2015/0258962 A1 | 9/2015 | Khanu | |
| 2015/0266418 A1 | 9/2015 | Salter et al. | |
| 2015/0279131 A1 | 10/2015 | Nespolo | |
| 2015/0284984 A1 | 10/2015 | Kanter et al. | |
| 2015/0287257 A1 | 10/2015 | Thompson | |
| 2015/0343945 A1* | 12/2015 | Salter | H05B 37/0227 315/77 |
| 2016/0009222 A1 | 1/2016 | Taylor | |

OTHER PUBLICATIONS

Office Action, U.S. Appl. No. 15/045,862, filed Feb. 17, 2016, dated Jul. 7, 2017.

Office Action; related U.S. Appl. No. 15/045,847; dated Nov. 14, 2016.

Office Action, U.S. Appl. No. 15/090,766, dated Jan. 10, 2017.

Notice of Allowance, U.S. Appl. No. 15/045,847, dated Jan. 18, 2017.

* cited by examiner

SYSTEM FOR ENHANCING THE VISIBILITY OF A GROUND SURFACE ADJACENT TO A LAND VEHICLE

CROSS-REFERENCE TO RELATED APPLICATIONS

This application is a continuation-in-part application of U.S. patent application Ser. No. 15/045,862 filed Feb. 17, 2016. This application is also a continuation-in-part of application of U.S. patent application Ser. No. 15/090,766 filed Apr. 5, 2016.

TECHNICAL FIELD

This invention generally relates to vehicle exterior lighting systems and, in particular, to systems for enhancing the visibility of ground surfaces adjacent to land vehicles.

Overview

Lighting systems for lighting the exterior of land vehicles is well known. One such prior art system senses a pedestrian's approach and lights the exterior such as by providing a "welcome mat" 1 to illuminate the entrance in front of both the driver and passenger doors as shown in FIG. 1.

Such lighting systems often include what are called "puddle lights" when directed downward toward the ground. Examples of such systems can be found in the following U.S. patent documents: 2009/0273941; 2010/0253919; 2010/0321945; 2011/0273671; 2012/0280528; 2014/0320823; 2015/038810; 2015/0266418; 2015/0343945; U.S. Pat. Nos. 6,416,209; 8,922,388 and 9,283,819.

Many of the above-noted lighting systems include a key fob or other hand-held communication device. When a key fob is used, it is assumed that the driver is within a predetermined proximity and that vehicle exterior lighting may be useful or helpful.

U.S. Pat. No. 7,175,321 discloses a vehicle projection system including a remote control for projecting decorative light designs onto exterior portions of a vehicle.

U.S. Pat. Nos. 8,694,195 and 8,983,717 disclose vehicle camera systems for use with land vehicles and including display units located in the driver's compartment to display images of the ground adjacent the vehicle.

The functions of a remote keyless entry system are often contained on the remote or key fob (i.e. or just "fob") or built into the ignition key handle itself. FIG. 2 is an exploded perspective view of a prior art key fob, generally indicated at 2, having upper and lower housing parts 3, a one-piece plastic protective covering 9, a loop antenna 4, a plurality of push buttons 5, an RF transmitter 6, a battery 7 and a semiconductor device 8 which typically stores (in memory) or generates identification data which identifies the particular key fob 2. When an RF signal is transmitted or emitted from the antenna 4 of the transmitter 6, the signal contains the identification data. In turn, a mobile communication device (not shown) including a receiver having an antenna is supported on the vehicle receives the signal and removes or extracts the identification data from the RF signal to determine if the key fob 2 is an authorized key fob.

The buttons 5 are dedicated to locking or unlocking the doors and opening the trunk or tailgate. On some minivans the power sliding doors can be opened/closed remotely. Some cars will also close any open windows and roof when remotely locking the car. Some remotes or key fobs also feature a panic button which activates the car alarm as a standard feature. Further adding to the convenience, some cars' engines with remote keyless ignition systems can be started by the push of one of the buttons 5 on the key fob 2, and convertible tops can be raised and lowered from the outside the vehicle while it's parked.

On cars where the trunk release is electronically operated, it can be triggered to open by one of the buttons on the key fob 2. Conventionally, the trunk springs open with the help of hydraulic struts or torsion springs, and thereafter must be lowered manually. Premium models, such as SUVs and estates with tailgates, may have a motorized assist that can both open and close the tailgate for easy access and remote operation.

Some cars have a proximity system that is triggered if a key-like transducer is within a certain distance of the car. Such systems are sometimes called hands-free or advanced key. With such a smart key system, a vehicle can be unlocked without the driver needing to physically push a button on the key fob to lock or unlock the car and is also able to start or stop the ignition without physically having to insert the key and turning the ignition. Instead, the vehicle senses that the key (located in a pocket, purse, etc.) is approaching the vehicle. When the key fob is within the car's required "bubble" distance (i.e., the required distance or range from the vehicle for the key to be recognized), there are two methods typically used by auto manufacturers to unlock the doors;

the car will automatically unlock the driver's door; and
the car doesn't unlock the door unless the keyholder touches one of the sensors located behind the door handles.

In certain vehicles there are also various functions built into the transmitter to perform various tasks. For instance, pressing the unlock button twice and keeping the button depressed on the second push allows the keyholder to roll down certain pre-programmed windows and/or the sunroof. Other functions range from turning on the headlights and various electronic equipment (factory or aftermarket). On some vehicles, the system prevents the driver or passenger from accidentally locking the keys in the car, via a sensor that detects whether the keyholder is within the "bubble" area outside the vehicle.

For purposes of this application, the term "vehicle door" is used to describe a hinged or sliding barrier in front of a vehicle opening which can be opened to provide access to the opening or closed to secure the opening. The term "vehicle door" includes but is not limited to, liftgates, tailgates and trunk lids.

For purposes of this application the term "transceiver" (i.e. transmitter/receiver) refers to a device that performs, with a single, common housing, package or structure (such as a chassis or chip), both transmitting and receiving functions, preferably using common circuit components for both transmitting and receiving.

For purposes of this application "multi-modal" refers to operability using different protocols, which may include one or more of different modulation schemes, different frequencies and different standards.

As used herein, the term "sensor" is used to describe a circuit or assembly that includes a sensing element and other components. In particular, at used herein, the term "motion sensor" is used to describe a circuit or assembly that includes a motion sensing element and electronics coupled to the motion sensing element. Motion sensors can be, but are not limited to, inertial sensors.

As used herein, the term "step motion" is used to describe pedestrian motions, such as walking, running, and stepping, as well as standing still (i.e., substantially no pedestrian motion).

As used herein, the term "motion sensing element" is used to describe a variety of electronic elements that can sense a motion. The motion sensing elements can be, but are not limited to, multi-axis accelerometers and/or gyroscopes.

For purposes of this application, "protocol" refers to a set of conventions governing the format and control of interaction among communicating functional units, and in general permitting devices and information systems to exchange data or information. Protocol may include semantic and syntactic rules that determine the behavior of entities in performing communication functions. Protocols may govern portions of a network, types of service, or administrative procedures. For example, a data link protocol is the specification of methods whereby data communications over a data link are performed in terms of the particular transmission mode, control procedures, and recover procedures. Protocols include the specific modulation formats and frequencies associated with the modulation formats.

Related U.S. patent documents include: U.S. Pat. Nos. 6,571,193; 7,202,775; 8,410,899, 8,788,152; 9,162,685; 2012/0249291; 2015/0021887; 2015/0258962; 2015/0279131; and 2015/0284984.

As described in 2015/0287257, smart phone applications have been developed to give smart phones the functionality of a key fob. For example, a smart phone with the appropriate software application or computer program(s) can be used in place of an electronic key fob to lock and unlock doors, control a car find feature (audible horn honk), start a vehicle remotely, or program auxiliary outputs (like trunk release). However, the wireless communication between the phone and the car generally occurs over a cellular network, thereby introducing latency between command and response time, as well as an increase in cost.

SUMMARY OF EXAMPLE EMBODIMENTS

An object of at least one embodiment of the present invention is to provide a system for enhancing the visibility of a ground surface adjacent to a land vehicle wherein an object detected adjacent the land vehicle or a welcome mat is displayed onto or adjacent the vehicle for enhanced viewing by a pedestrian approaching the vehicle and carrying an authorized hand-held device.

In carrying out the above object and other objects of at least one embodiment of the present invention, a system for enhancing the visibility of a ground surface adjacent to a land vehicle is provided. The system includes a mobile communication device supported on the vehicle for movement therewith and a hand-held communication device operative to produce a signal containing identification data which identifies the hand-held device. The mobile device is operative to receive the signal and remove the identification data from the signal. Control logic is coupled to the mobile device and is operative to determine if the hand-held device is an authorized hand-held device based on the identification data. An imaging assembly is supported on the vehicle to obtain an image of the ground surface and an image processor processes the image to detect an obstacle located on the ground surface. The control logic is operative to generate a display command signal. A display device is responsive to the display command signal to display in real time the detected obstacle or a welcome mat onto or adjacent the vehicle for enhanced viewing by an approaching pedestrian when the pedestrian carrying the authorized hand-held device is located within a predetermined range of the mobile device.

The imaging assembly may include a source of light to illuminate the ground surface to obtain reflected light energy.

The display device may display the detected obstacle or the mat onto an exterior side surface of the vehicle.

The display device may be a light-field or holographic display device wherein the displayed obstacle or mat may be a computer-generated image floating outside and adjacent the vehicle.

The hand-held communication device may be a key fob.

The imaging assembly may include an image sensor to detect the reflected light energy.

The imaging assembly may include an image sensor to capture an infrared image of the ground surface.

The imaging assembly may be supported on a side view mirror assembly mounted on an exterior of the vehicle.

The mirror assembly may be mounted on an exterior side surface of a door of the vehicle.

The mirror assembly may include a housing wherein the imaging assembly may be supported within the housing.

Further in carrying out the above object and other objects of at least one embodiment of the present invention, a system for enhancing the visibility of a ground surface adjacent to a land vehicle is provided. The system includes a mobile communication device supported on the vehicle for movement therewith and a hand-held communication device operative to produce a signal containing identification data which identifies the hand-held device. The mobile device is operative to receive the signal and remove the identification data from the signal. Control logic is coupled to the mobile device and is operative to determine if the hand-held device is an authorized hand-held device based on the identification data. An imaging assembly is supported on the vehicle to obtain an image of the ground surface. An image processor processes the image to detect an obstacle located on the ground surface. The control logic is operative to generate a display command signal. A display device is responsive to the display command signal to display in real time the detected obstacle onto or adjacent the vehicle for enhanced viewing by an approaching pedestrian when the pedestrian carrying the authorized hand-held device is located within a predetermined range of the mobile device.

The imaging assembly may include a source of light to illuminate the ground surface to obtain reflected light energy.

The display device may display the detected obstacle onto an exterior side surface of the vehicle.

The display device may be a light-field or holographic display device wherein the displayed obstacle is a computer-generated image floating outside and adjacent the vehicle.

The hand-held communication device may be a key fob.

The imaging assembly may include an image sensor to detect the reflected light energy.

The imaging assembly may include an image sensor to capture an infrared image of the ground surface.

The imaging assembly may be supported on a side view mirror assembly mounted on an exterior of the vehicle.

The mirror assembly may be mounted on an exterior side surface of a door of the vehicle.

The mirror assembly may include a housing wherein the imaging assembly may be supported within the housing.

Still further in carrying out the above object and other objects of at least one embodiment of the present invention, a system for enhancing the visibility of a ground surface adjacent to a land vehicle is provided. The system includes a mobile communication device supported on the vehicle for movement therewith and a hand-held communication device operative to produce a signal containing identification data which identifies the hand-held device. The mobile device is operative to receive the signal and remove the identification data from the signal. Control logic is coupled to the mobile device and is operative to determine if the hand-held device is an authorized hand-held device based on the identification data. An imaging assembly is supported on the vehicle to obtain an image of the ground surface and an image processor processes the image to detect an obstacle located on the ground surface. The control logic is operative to generate a display command signal. A display device is responsive to the display command signal to display in real time a welcome mat onto or adjacent the vehicle in the absence of any detected obstacle for enhanced viewing of the mat by an approaching pedestrian when the pedestrian carrying the authorized hand-held device is located within a predetermined range of the mobile device.

BRIEF DESCRIPTION OF THE DRAWINGS

FIG. 4A is a schematic view of one type of obstacle that could conceivably be found on the ground surface;

FIG. 4B is a schematic view of a second type of obstacle;

FIG. 4C is a schematic view of a third type of obstacle;

FIG. 4D is a schematic view of a fourth type of obstacle;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
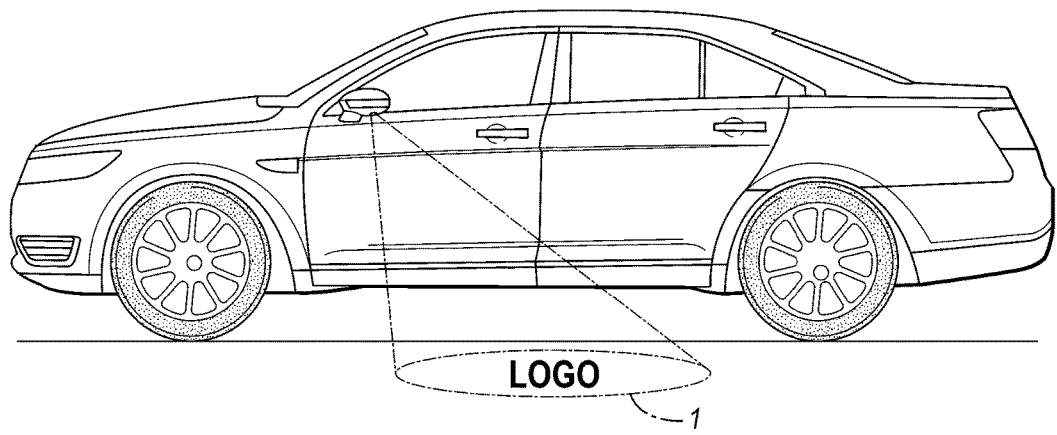
FIG. 1 is a schematic view of a land vehicle with a prior art "puddle" light.
Figure 2:
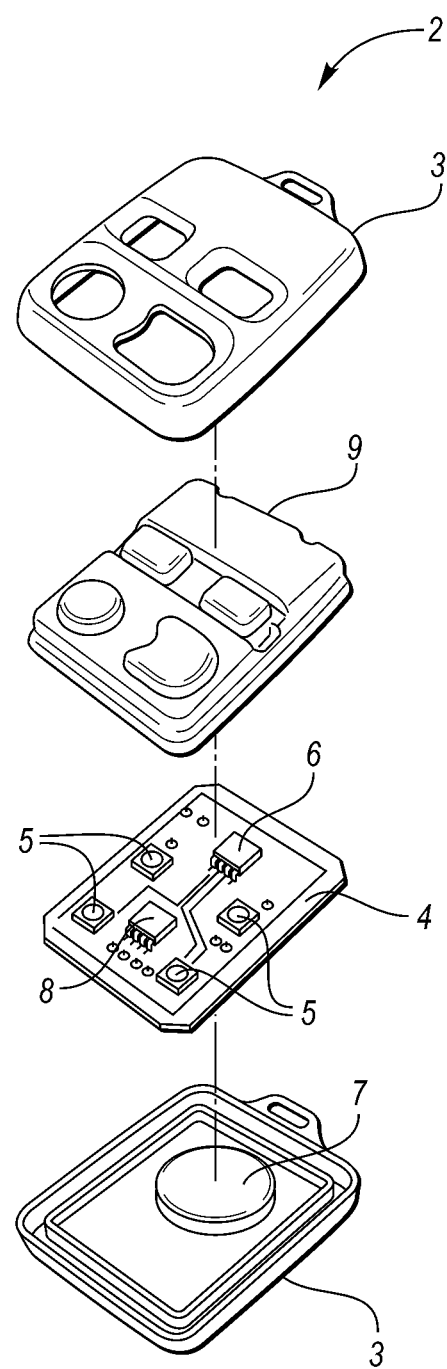
FIG. 2 is an exploded perspective view of a prior art key fob.
Figure 3:
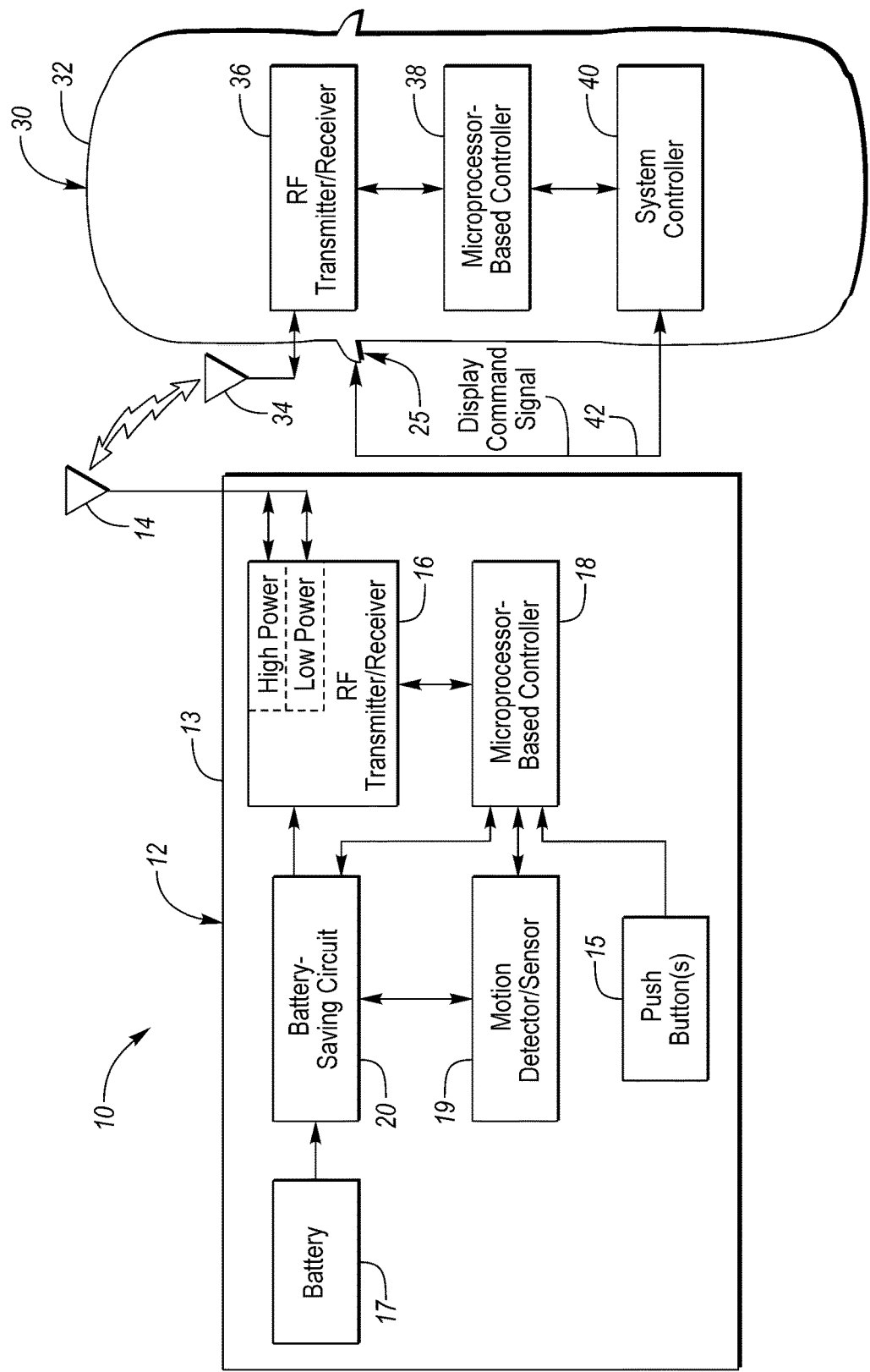
FIG. 3 is a block diagram of a mobile communication device supported on a vehicle and a hand-held communication device such as a key fob for use in a system for enhancing the visibility of a ground surface adjacent the vehicle.
Figure 4E:
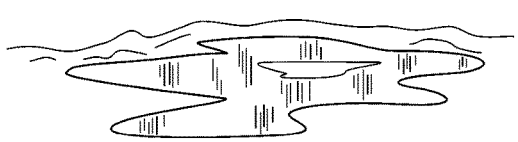
FIG. 4E is a schematic view of a fifth type of obstacle.
Figure 4E:
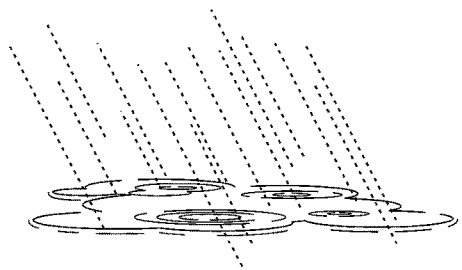
Figure 4E:
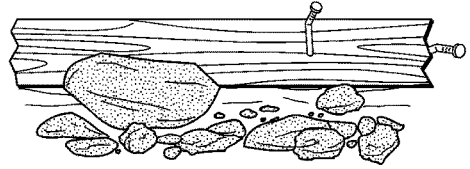
Figure 4E:
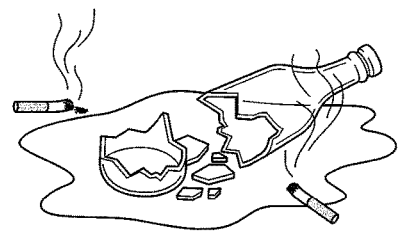
Figure 4E:

Referring now to FIG. 3, a system, generally indicated at 10, is provided for enhancing the visibility of a ground surface adjacent a land vehicle door as disclosed in FIG. 1. The system 10 includes a mobile communication device, generally indicated at 30, supported on the vehicle 32 for movement therewith and capable of wirelessly receiving radio frequency signals. The system 10 also includes a hand-held communication device, generally indicated at 12, such as a key fob. The device 12 also includes a motion sensor or detector 19 operative to provide motion signals to a microprocessor-based controller 18 as a function of motions made by a pedestrian carrying the hand-held device 12. The system 10 further includes control logic coupled to the devices 12 and 30. As described in detail herein below, the control logic is preferably implemented by software in one or both of the microprocessor-based controllers 18 and 38 and/or a system controller 40.

Each of the hand-held and mobile communication devices 12 and 30 are capable of wirelessly transmitting and receiving, respectively, RF command signals via transceivers 16 and 36 as long as the pedestrian carrying the hand-held device 12 is within a first range of the mobile device 30. Each of the command signals contains identification data which identifies the hand-held device 12 and command data which identifies a pedestrian command for the vehicle 32 to automatically perform an operation. The mobile device 30 is operative to remove the identification and command data from the command signals and the control logic is operative to determine if the hand-held device 12 is an authorized hand-held device 12 based on the identification data.

The hand-held device 12 may include an energy storage device to supply stored electrical energy to the control logic and the motion sensor. The energy storage device may comprise a battery 17.

The mobile device 30 may include an RF receiver or transceiver 36 wherein the hand-held device 12 includes a transmitter or transceiver 16 to wirelessly transmit the command signals which are received by the receiver 36.

The hand-held device 12 may include a user interface 15 coupled to the control logic or controller 18 wherein the control logic 18 is operative to determine whether the pedestrian has activated the interface 15 to control the transmitter 16 to transmit one of the command signals. The user interface may include one or more push buttons 15 one of which may be dedicated to opening a vehicle door.

The mobile device 30 may include the first transceiver 36 wherein the hand-held device 12 includes the second transceiver 16 that communicates with the first transceiver 36 via two-way communication. The control logic within the controller 38 may monitor the position of the hand-held device with respect to the mobile device 30 based on data received from the second transceiver 16.

The hand-held device 12 can be any hand-held device with a wireless interface, such as a laptop computer, a tablet device, a key fob, a car key, an access card, a mobile phone, a portable gaming device, a portable multimedia player, a portable music player, a personal digital assistant (PDA), any hand-held electronic or electro-mechanical device. For example, such a hand-held device can be an iPod®, iPhone®, or iPad® device available from Apple Inc. of Cupertino, Calif. In one embodiment, the fob 12 includes the motion sensor 19 for sensing motion of a pedestrian carrying the fob 12. The motions of the pedestrian may be interpreted by the microcontroller 18 or a digital signal processor, which executes instructions according to a predetermined program. An antenna 14 of the device 12 may be located internal or external to the fob housing 13.

Some personal hand-held electronic devices such as some mobile phones, have implemented MEMS inertial sensors. For example, the Nokia 5500 sports phone uses an embedded 3-axis MEMS inertial sensor to detect the steps a user takes. The step counter or pedometer software application within the Nokia 5500 then tracks the steps taken, time lapsed and distanced traveled (once a standardized step distance has been entered).

The vehicle 32 typically has several functions that may be controlled by the fob 12. By way of non-limiting example, the vehicle 32 may have controlled an opening hood, a front door, a rearward hinged or sliding door, a trunk or lift gate, head lamps, tail lamps, and an alarm tone.

The vehicle 32 can be any suitable land vehicle, such as an automobile, a truck, a bus, a train, a tractor, a golf cart, a go-kart, a motorcycle, a scooter, a motorized bicycle, a lawn mower, a snowmobile, a remote controlled device (e.g., remote controlled car), and/or the like.

The microcontroller 18 determines when a command control signal should be transmitted to the vehicle 32. The vehicle antenna 34 receives the command signal and sends it to the receiver 36 for processing. The controller 38 or a system controller 40 coupled to the controller 38 then causes action to be taken in correspondence with the received command signal, such as emitting a door opening command or a display command signal along a wire or vehicle bus 42. For example, if the fob 12 determines that the fob user would like to open a vehicle door, then the fob 12 sends a command signal corresponding to a door opening function. The vehicle 32 will receive and process the command signal via the antenna 34 and the receiver 36, and affect the opening of the vehicle door. Similarly, the fob 12 and the device 30 may work together to operate the other functions of the vehicle 32 such as interior and exterior vehicle lighting.

The controller 18 receives sensor data or signals from the motion sensor 19. Once received from the motion sensor 19, the transmitter 16 retransmits the data or signals in analog form or, alternatively, in digitally encoded form with the digital encoding taking place in the controller. In such an embodiment, the vehicle 32 is equipped with the microprocessor-based controller 38 for receiving, recognizing, and effecting action based upon the commands. Such an arrangement allows the fob 12 to be used regardless of the vehicle's option contents. If the vehicle 32 is equipped with a transmitter, such as transceiver 36, then the fob 12 may be equipped with the transceiver 16 for receiving signals from the vehicle 32 in addition to transmitting signals to the vehicle 32.

Although not explicitly illustrated, one of ordinary skill in the art will recognize that one or more of the illustrated steps or functions may be repeatedly performed depending upon the particular application and processing strategy being used. Preferably, the control logic is implemented primarily in software executed by the microprocessor-based controller 18 and/or the controller 38 and/or the system controller. Of course, the control logic may be implemented in software, hardware, or a combination of software and hardware depending upon the particular application. When implemented in software, the control logic is preferably provided in a computer-readable storage medium having stored data representing instructions executed by a computer. The computer-readable storage medium or media may be any of a number of known physical devices which utilize electric, magnetic, and/or optical devices to temporarily or persistently store executable instructions and associated calibration information, operating variables, and the like. For example, the computer-readable storage media may include volatile and nonvolatile storage in read-only (ROM), random-access memory (RAM), and keep-alive memory (KAM). For example, KAM may be used to store various operating variables. The computer-readable storage media may be implemented using any of a number of known memory devices such as PROMs (programmable read-only memory), EPROMs (electrically PROM), EEPROMs (electrically erasable PROM) and/or flash memory.

The system 10 of at least one embodiment of the invention may comprise the generally hand-held communication device such as the key fob 12 and control logic which controls communication between the fob 12 and the receiver 36. The fob 12 is generally hand-held by users or pedestrians and/or is carried within objects, such as pockets and purses. The fob 12 is generally operable to communicate identification information or data to the device 30.

Fobs, such as the fob 12, may serve different functions and be associated with either users or objects. As shown in FIG. 3, the fob 12 and the receiver 36 generally each include a transmitter, a receiver, a combination transmitter and receiver (i.e. a transceiver), a transponder or other receiving or transmitting mechanisms suitable for communicating identification and/or command information between the fob 12 and the receiver 36.

The power source for the fob 12 may, in many embodiments, include the battery 17 or other such energy storage element. In some embodiments, additional power source elements may be present. For example, the fob 12 may include capacitive or inductive-based vibratory energy converters for generating energy from kinetic energy. Such a converter may be used to supply a trickle charge for recharging the battery 17 when the fob 12 is in motion. In other embodiments, the fob 12 may include solar or other energy converters for harvesting energy and charging the battery 17. The fob 12 may also or alternatively be equipped with a recharging port to permit connection to a recharger.

The fob 12 may also include a battery-saving circuit 20 coupled to the battery 17, the sensor 19, the controller 18 and the transmitter 16 to provide power from the battery 17 when the fob 12 is "awake", such as when the sensor 19 detects that the fob 12 is in motion. Otherwise, when the fob 12 is not "awake" a lower level of current may be provided.

For purposes of unidirectional and bidirectional communication of data or other signaling between the fob 12 and the device 30, several formats/protocols exist, and may be utilized. The system may utilize fobs using different technologies or fobs combining different technologies.

The fob 12 may include a database (i.e. within the controller 18) to store tracking processes, fob specific event data or non-tracking process subject data. Event data includes the fob's location and switch state's history. Subject data includes data or pointers to data (information needed to retrieve the data from another source) such as name or record number pertinent to each fob's subject.

One or more fobs having a unique ID are typically provided for each vehicle. The fobs also typically include one or more inertial sensors such as accelerometers to sense the movement or orientation of the fobs. The accelerometers may provide input or feedback regarding the movement of the fob, and, thus, the pedestrian user or object with which it is associated. By way of example, the accelerometers may include a 3-axis accelerometer.

As previously mentioned, the fob 12 may communicate with the device 30 in a bidirectional fashion. The fob 12 may be programmed with data, and may communicate data.

The fob 12 may include a sensor to receive information from the device 30 and may be configured to transmit information based upon the input from the device 30. The fob 12 or its receiver 16 may be designed to sense a particular environment, such as a RF signal from the device 30 in the radio frequency range.

The fob 12 (as well as the device 30) of at least one embodiment of the present invention may include elements generally found in many communication devices, whether individually or part of an integrated circuit or microcontroller, and including elements integrated into a single chip. As previously mentioned, these elements may include a battery, antenna interfaces, antenna(s), modulators, demodulators, transceivers, duplexers, RF switches, filter, I/Os, UARTs, interrupts, memory, modems and the like, and the code to operate the device elements.

Low and High Power RF

Still referring to FIG. 3, the signaling fob 12 can be designed to communicate by various technologies and protocols. In one embodiment, the fob 12 emits low and high-power radio frequency (RF) signals. The fob 12 typically includes a microchip, the microprocessor-based controller 18, and a transmitter 16 having low and high-power settings and which transmits an identification signal, which may include, for example an identification code or data specific to the vehicle associated with the fob 12. In a preferred embodiment, each fob 12 emits a lower-power RF signal via the transmitter 16 containing digitally encoded data generated by the microprocessor-based controller 18. This is done to avoid the high-power consumption required to transmit a higher-power signal and to limit the range of the fob 12. The transmitter 16 transmits the identification and command signal to control logic of the controller 38 via the receiver 36 of the device 30. For example, the transmitter 16 of the fob 12 transmits the identification signal to the receiver 36. The receiver 36 then provides the information or data received via the signal to the control logic of the controller 38 for further processing and recording.

The fob 12 may further include an RF receiver as part of a transceiver 16 that is operable to receive a signal from the transceiver 36 of the device 30 via the antenna 34. The fob 12 may be operable to activate either a visual, audible or tactile alert indicator in response to receiving the signal from the transceiver 36.

The RF signal transmitted from the fob's antenna 14 may be modulated to represent each fob's unique ID number. Each vehicle's identification data is associated with each unique fob number. This provision allows the control logic of the controller 38 to associate unique fob data with the particular vehicle.

Figure 10:
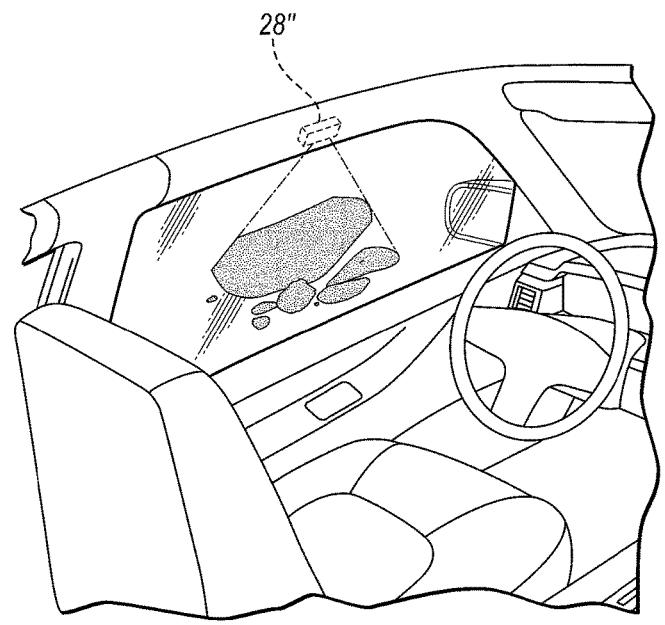
FIG. 10 is a schematic perspective view, partially broken away, of an interior portion of the vehicle with the detected obstacle projected or displayed on the door window from the interior of the vehicle by a display device.

The fob 12 may transmit a radio frequency (i.e. RF) signal via the antenna 14, containing a data packet with at least the unique fob ID, in a substantially spherical pattern. The radio frequency signals emitted by the antenna 14 are received by the antenna 34 of the receiver 36 of the device 30 having a predetermined range in all directions. The radio frequency receiver 36 converts encoded signals emitted by the fob 12 into electrical signals or data and transmits them to the controller 38 for processing and then to the system controller for processing into a display command signal (as described herein) for communication over the network or bus 42 of the vehicle 32 to a display device 28 or 28' (within the mirror assembly 25) or 28" (supported within the interior of the vehicle i.e., FIG. 10) to display in real time a detected obstacle or welcome mat onto or adjacent the vehicle 32 for enhanced viewing by an approaching pedestrian who can more easily see the obstacle or welcome mat.

The embodiment of the system 10 may include a receiver assembly including one or more receivers, such as the receiver 36, which are utilized to receive the fob's RF signals and transmit coded data via the vehicle network via the controller 38.

The RF signal sent via the antenna 34 may contain a data packet with ID data space providing a number of unique fob IDs. Additionally, the RF data packet may generate error checking data and fob qualifier data (e.g. battery state, motion state, etc.) as an optional prefix and/or optional suffix to the unique fob ID.

The signal emitted via the transmitter 16 may contain a data packet that is a result of the microprocessor or controller 18 having applied a size reduction function or algorithm to the data packet. The resulting packet is shorter than the parent RF data packet thereby reducing the amount of energy required to send the signal when compared to transmitting the entire RF data packet.

The size reduction function may be a checksum, CRC or other function that derives a smaller number from a larger number in such a way as to increase the statistical probability of there being only one unique size reduction function result for each unique fob ID within the area covered by the radio frequency receiver 36.

Radio Frequency Identification

In one embodiment, the fob 12 contains a microchip, the microprocessor-based controller 18, and an RF transmitter 16 including an antenna 14 which operates at a certain frequency, stores a specific ID and other user or object-related data, and sends the data to the receiver 36 of the device 30 at certain times or upon request.

The device 30 comprises the antenna 34 and the transceiver 36, and reads data from, and writes data to the fob 12. The antenna 34 establishes the communication between the fob 12 and the transceiver 36, and its shape and dimensions determine the performance characteristics such as the frequency range. Larger antenna loops tend to yield wider coverage areas, but the signal-to-noise ratio decreases at the same time.

The frequency on which the system 10 operates is another element which determines the characteristics of the signals traveling between the devices 12 and 30. Available frequencies include low frequency (LF), high frequency (HF), and ultra-high frequency (UHF). Super-high frequency (SHF) or microwave is also used. UHF passive fobs offer simple and inexpensive solutions. Active fobs typically operate on UHF.

Ultra Wideband

The signaling fob 12 can be designed to utilize Ultra Wideband (UWB) as another type of short-range communication radio technology. UWB systems can be made to accurately locate a fob in three dimensions despite signal attenuation and multiple signal pathways. UWB is able to provide 2- and 3-D localization even in the presence of severe multipath by detecting time-of-flight of the radio transmissions at various frequencies. Another advance of the UWB system is the low average power requirement that results from low pulse rate.

Generally, the system 10 associates pedestrians with a radio frequency fob 12 capable of emitting, preferably on an intermittent basis, UWB signals which signals include information identifying the fobs. The one or more signals are received by UWB devices 30 which are at one or more known locations on the vehicle. Increasing the number of receivers, increases the accuracy of the fob's location. The method may also include communicating at least fob identification information and one or more of time-of-arrival information and angle-of-arrival information from the UWB receivers to the control logic.

A UWB device 30 includes an RF sensor or receiver 36 which receives the UWB signals emitted by the fob 12 and communicate information to the controller 38 for further routing or processing. Other information may comprise the UWB fob identification, time-of-arrival, angle of arrival, any available environmental condition information, and combinations of them. Such communication may be wired or wireless and may be routed through intermediate devices.

A UWB signal is preferably pulsed every second or every two seconds, and the pulse rate is designed based upon the desired battery life of the key fob 12, and the need to track movement direction and rate of pedestrians or objects.

Similar to the descriptions above, other communication protocols are available. These include Wireless Fidelity (Wi-Fi). Wi-Fi is capable of a range of many meters.

Another communication protocol is Bluetooth. Bluetooth is a standard wire-replacement communications protocol primarily designed for low-power consumption, with a short range based on low-cost transceiver microchips in each device. Because the devices use a radio (broadcast) communications system, they do not have to be in visual line of sight of each other. Range for 4.2 Bluetooth LE beacons (BLE 4.2) is power-class-dependent as shown in the following table:

| Power Class | Max. Permitted Power (mW) | (dBm) | Typ. range (m) |
|---|---|---|---|
| 1 | 100 | 20 | ~100 |
| 2 | 2.5 | 4 | ~10 |
| 3 | 1 | 0 | ~1 |

Also, the system 10 includes control logic either partially or completely contained within a device controller 30 or partially or completely contained within the vehicle electrical system 34 including the system controller 40. The control logic may be hardware, software or a combination of hardware and software.

The system 10 also includes an imaging assembly, generally indicated at 22, including a camera 23 which has an image sensor and one or more optical lenses supported within a housing of the camera 23. The camera 23 is supported within a housing 24 of a mirror assembly, generally indicated at 25, mounted on an exterior side surface of a door of the vehicle 32. The assembly 22 includes a mirror such as an apertured, one-way mirror 21. The imaging assembly 22 may include a source of light 26 and a lens 26b supported within the housing 24 to illuminate the ground surface adjacent the vehicle 32. Reflected light energy, which includes an image of the ground surface, is detected by the image sensor of the camera 23 in one embodiment. In another embodiment, the image sensor is an infrared sensor which captures an infrared image of the ground surface. An image processor 27 processes the images from the image sensor of the camera 23 to detect an obstacle such as ice, water, debris, rock(s), vehicle fluid, etc. (examples, shown in FIGS. 4A-4E) located on the ground surface adjacent the vehicle 32.

Figure 5:
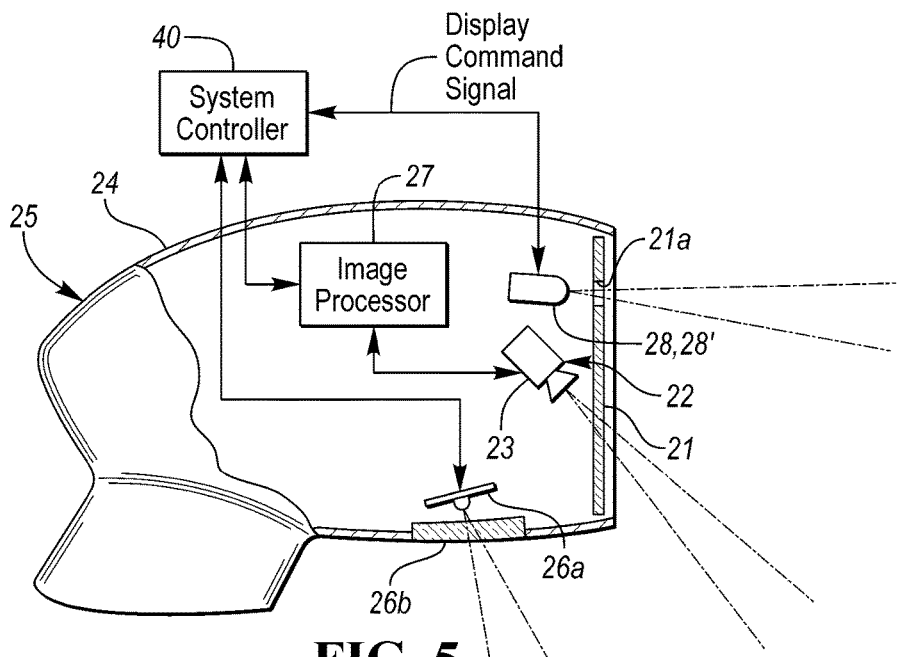
FIG. 5 is a side schematic view, partially broken away and in cross-section, of a vehicle side view mirror assembly which houses an imaging assembly including a camera and an image processor, a source of light, and a display device in accordance with at least one embodiment of the present invention.
Figure 9:
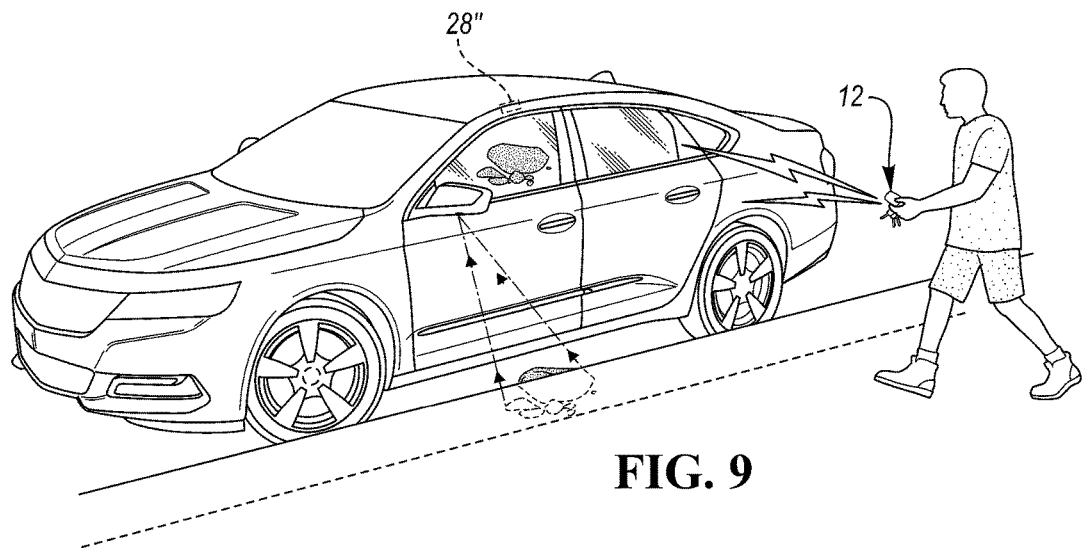
FIG. 9 is a schematic perspective view of a vehicle wherein an obstacle is at least partially hidden from an approaching pedestrian carrying an authorized hand-held device such as a key fob; the detected obstacle is displayed on a door window of the vehicle.

The system 10 also includes a visual display device 28 or 28' (i.e. FIG. 5) or 28" (FIGS. 9 and 10) to provide visual information regarding any detected obstacle to an approaching pedestrian carrying an authorized hand-held device 12. The visual display device 28 may comprise a projector coupled to the image processor 27 through the system controller 40 to project the detected obstacle through an aperture 21 or in the mirror 21 and onto or adjacent a door of the vehicle 32. In this way, a pedestrian approaching the vehicle 32 (see FIG. 9) can view an image of the obstacle or a welcome mat at a height on the door which is closer to the average eye height or level (approximately 5 feet) of the pedestrian. Oftentimes, such obstacles are very difficult to see due to low light conditions, are at least partially blocked from view of an approaching pedestrian (see FIG. 9) or the pedestrian's view is blocked by the infant, animal or item(s) that the pedestrian is carrying.

Figure 6:
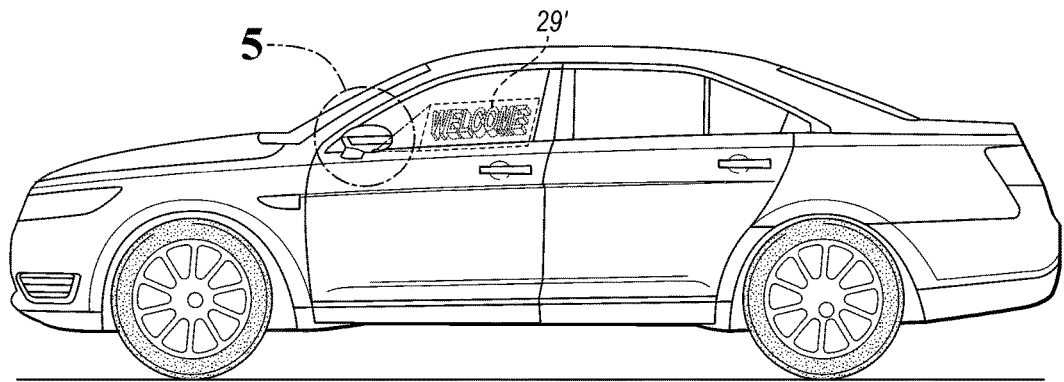
FIG. 6 is a side elevational view of a vehicle having a light-field or holographic display device supported by the side view mirror assembly and which displays a "floating" mat outside and adjacent the vehicle.
Figure 7:
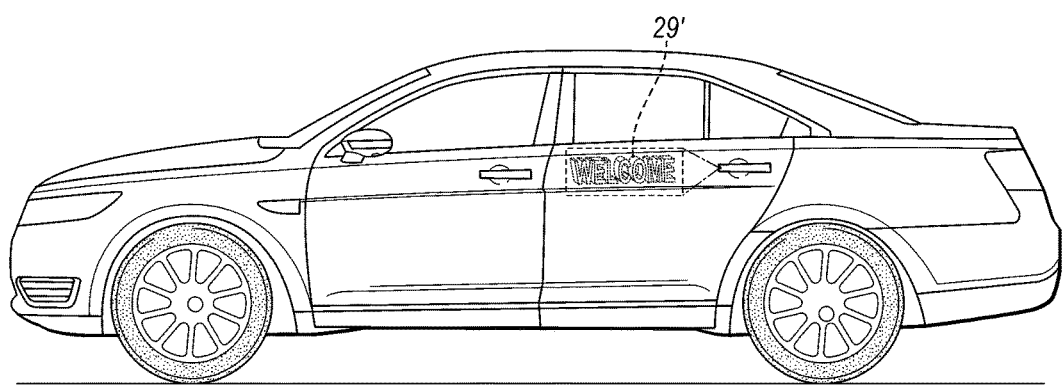
FIG. 7 is a view similar to the view of FIG. 6 except the display device is supported on a handle assembly of the vehicle.
Figure 8:
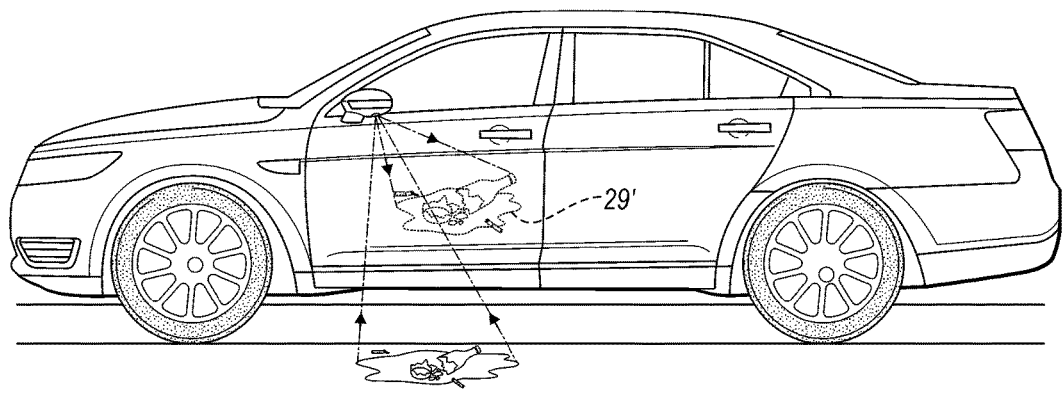
FIG. 8 is a side elevational view of a vehicle having a display device which displays a detected obstacle onto an exterior side surface of the vehicle.

As shown in FIGS. 6, 7 and 8, the visual display device 28' may be a 3-D light-field or holographic display device and the visual information may be a 3D image 29' of an obstacle (FIG. 8) or welcome mat FIGS. 6 and 7 (in the absence of an obstacle) which appears to "float" or "hover" in front of the door of the vehicle 32 (again closer to the average pedestrian adult eye level of 5 feet).

As described in U.S. patent document 2015/0077327, the visual display device 28" (FIGS. 9 and 10) may include any device or devices capable of displaying images on an image surface, such as a vehicle window, under the control of the control logic of the system controller 40, and can be adapted for viewing from outside the vehicle 32. The display device 28" may be integral to the window, such as an LCD. Such a display can be illuminated by one or more light sources such as a projector or display device 28" under the control of the control logic. Such light sources can be mounted at any operable locations enabling light emission onto the window from inside the vehicle 32. Examples of such mounting locations can include in the vehicle floor, in the vehicle headliner (FIG. 10), within the vehicle door structure, or in the exterior door panel.

The display device 28" may include a coating or film layer. The coating may be a polymer dispersed liquid crystal (PDLC) film, applied to the vehicle window to provide both transparency when inactive and partial or complete opacity when active. A vehicle window treated with the coating is thereby operable to display content as a projection image visible from outside the vehicle 32. In response to the approach of a pedestrian carrying an authorized hand-held device 12, the control logic of the system controller 40 is coupled to the coating and causes the coating to change from transparent to opaque so that the projector or display device 28" may project the detected obstacle or welcome mat (in the absence of any detected obstacle).

Computer-generated images or holograms have the advantage that the objects which one wants to show do not have to possess any physical reality at all (completely synthetic hologram generation, such as the welcome mat). On the other hand, holographic data of existing objects may be generated optically, but digitally recorded and processed, and brought to display on or adjacent the vehicle door.

As previously mentioned, the imaging assembly 22 may include the camera 23 to image visually perceptible reflected signals or visually imperceptible infrared signals to obtain a set of images which are processed by the image processor 27 which processed images, in turn, are communicated to the system controller 40. The camera 22 may be a thermal imaging camera, or night vision device or an infrared illuminated ($I^2$) camera as described below.

Thermal Imaging Camera

Thermal imagers or cameras may be called sensors. Such cameras make pictures from heat, not visible light. Heat (also called infrared, or thermal, energy) and light are both parts of the electromagnetic spectrum, but a camera that can detect visible light won't see thermal energy, and vice versa.

Thermal cameras can detect small differences in heat—as small as 0.01° C.—and display these differences as shades of grey in black and white TV video. Most objects give off thermal energy, even ice. The hotter something is the more thermal energy it emits. This emitted thermal energy is called a "heat signature". When two objects next to one another have even small heat signatures, they show up quite clearly to a thermal camera or imager regardless of lighting conditions.

Thermal energy comes from a combination of sources, depending on what one is viewing. Some things—warm-blooded animals, engines and machinery, for example—create their own heat, either biologically or mechanically. Other things—land, rocks, buoys, vegetation—absorb heat from the sun during the day and radiate it during the night.

Because different materials absorb and radiate thermal energy at different rates, an area that one normally thinks of as being one temperature is actually a mosaic of subtly different temperatures.

Night Vision Device

Night vision devices take in small amounts of visible light, magnify it, and project the magnified light on a display.

Such devices and other lowlight cameras are not very useful during twilight hours, when there is too much light for them to work effectively, but no enough light for one to see with the naked eye. By contrast, thermal cameras aren't affected by visible light, so they can give one clear pictures even when one is looking into the setting sun.

Infrared Illuminated ($I^2$) Camera $I^2$ cameras try to generate their own reflected light by projecting a beam of near-infrared energy that their imager can see when it bounces off an object. $I^2$ cameras rely on reflected light to make an image and, consequently, so they have the same limitations as night vision cameras that depend on reflected light energy—short range, and poor contrast.

The camera 23 may have a wide-angle lens system, an omnidirectional image capturing apparatus to create a panoramic image or a panoramic imaging system to capture images at the sides of the vehicle 32.

As previously mentioned, the camera 23 and the image processor 27 receive and process images of any obstacles located in the ground surface adjacent the vehicle 32. The display unit 28 or 28' or 28" is controlled by the system controller 40 to display the obstacles or a "welcome mat" based on the processed images.

As previously mentioned with respect to FIGS. 6 and 7, the display device 28' has the ability to generate and display the images as realistic, floating, three-dimensional images 29', (i.e., as light-field or holographic images). Therefore, as the pedestrian moves his/her head around, each holographic image 29' appears to change just as the image of a real object changes. Such systems are disclosed in published U.S. patent applications 2014/0146133; 2014/029375; 2014/ 0111856; 2015/0036068; 2016/003705; 2014/0347361; 2015/0033599; 2015/02011176; 2016/0021755; and 2016/ 0033705. Such systems are further disclosed in U.S. Pat. No. 9,201,270 and published in U.S. patent application No. 2013/0321581 assigned to Leia Inc. of Menlo Park, Calif. and Ostendo Technologies, Inc. of Carlsbad, Calif., respectively.

As previously mentioned, the imaging assembly may include (as discussed in U.S. patent application No. 2012/ 0262540) a panoramic, view-imaging apparatus. The apparatus typically includes a housing, a concave panoramic reflector, a support structure configures to hold the concave panoramic reflector in a fixed position with respect to the housing, and a mounting device for positioning the housing in a fixed orientation with respect to the imaging assembly such that light reflected by the concave panoramic reflector is directed to a light sensor of the camera 23 of the imaging assembly 22.

Alternatively, the imaging assembly may include (as disclosed in U.S. patent application No. 2013/0235149) an image capturing apparatus for capturing an image of a subject using a plurality of imaging devices and a plurality of lenses for the imaging devices, respectively. A single image processor may be configured to perform predetermined image processing on the images.

Yet still alternatively, the imaging assembly may include (as described in U.S. Pat. No. 8,659,841) a super-wide angle lens system.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for displaying an image of a ground surface condition adjacent a land vehicle, the system comprising:
    a mobile communication device supported on the vehicle for movement therewith;
    a hand-held communication device operative to produce a signal containing identification data which identifies the hand-held device wherein the mobile device is operative to receive the signal and remove the identification data from the signal;
    control logic coupled to the mobile device and operative to determine if the hand-held device is an authorized hand-held device based on the identification data;
    an imaging assembly supported on the vehicle to obtain an image of the ground;
    an image processor to process the image to detect the condition on the ground surface, the control logic being operative to generate a display command signal; and
    a display device responsive to the display command signal to display an actual image of the detected condition onto or adjacent the vehicle above the ground surface for viewing by an approaching pedestrian when the pedestrian carrying the authorized hand-held device is located within a predetermined range of the mobile device.

2. The system as claimed in claim 1, wherein the imaging assembly includes a source of light to illuminate the ground surface adjacent to the vehicle to obtain reflected light energy.

3. The system as claimed in claim 1, wherein the display device displays the image of the detected ground condition onto an exterior side surface of the vehicle.

4. The system as claimed in claim 1, wherein the display device is a light-field or holographic display device and wherein the displayed ground condition or mat is a computer-generated image floating outside and adjacent the vehicle.

5. The system as claimed in claim 1, wherein the hand-held communication device comprises a key fob.

6. The system as claimed in claim 2, wherein the imaging assembly includes an image sensor to detect the reflected light energy.

7. The system as claimed in claim 1, wherein the imaging assembly includes an image sensor to capture an infrared image of the ground surface condition.

8. The system as claimed in claim 1, wherein the imaging assembly is supported on a side view mirror assembly mounted on an exterior of the vehicle.

9. The system as claimed in claim 8, wherein the mirror assembly is mounted on an exterior side surface of a door of the vehicle.

10. The system as claimed in claim 8, wherein the mirror assembly includes a housing and wherein the imaging assembly is supported within the housing.

11. A system for displaying an image of a ground surface condition adjacent a land vehicle, the system comprising:
a mobile communication device supported on the vehicle for movement therewith;
a hand-held communication device operative to produce a signal containing identification data which identifies the hand-held device wherein the mobile device is operative to receive the signal and remove the identification data from the signal;
control logic coupled to the mobile device and operative to determine if the hand-held device is an authorized hand-held device based on the identification data;
an imaging assembly supported on the vehicle to obtain an image of the ground surface condition;
an image processor operative to process the image to detect the condition on the ground surface, the control logic being operative to generate a display command signal; and
a display device operative to, responsive to the display command signal, display an actual image of the detected condition onto the vehicle above the ground surface for viewing of the detected condition by an approaching pedestrian when the pedestrian carrying the authorized hand-held device is located within a predetermined range of the mobile device.

12. The system as claimed in claim 11, wherein the imaging assembly includes a source of light to illuminate the ground surface to obtain reflected light energy.

13. The system as claimed in claim 11, wherein the display device displays the detected ground surface condition onto an exterior side surface of the vehicle.

14. The system as claimed in claim 11, wherein the display device is a light-field or holographic display device and wherein the displayed ground surface condition is a computer-generated image floating outside and adjacent the vehicle.

15. The system as claimed in claim 11, wherein the hand-held communication device comprises a key fob.

16. The system as claimed in claim 12, wherein the imaging assembly includes an image sensor to detect the reflected light energy.

17. The system as claimed in claim 11, wherein the imaging assembly includes an image sensor to capture an infrared image of the ground surface condition.

18. The system as claimed in claim 11, wherein the imaging assembly is supported on a side view mirror assembly mounted on an exterior of the vehicle.

19. The system as claimed in claim 18, wherein the mirror assembly is mounted on an exterior side surface of a door of the vehicle.

20. The system as claimed in claim 18, wherein the mirror assembly includes a housing and wherein the imaging assembly is supported within the housing.

21. A system for displaying an image of a ground surface condition adjacent a land vehicle, the system comprising:
a mobile communication device supported on the vehicle for movement therewith;
a hand-held communication device operative to produce a signal containing identification data which identifies the hand-held device wherein the mobile device is operative to receive the signal and remove the identification data from the signal;
control logic coupled to the mobile device and operative to determine if the hand-held device is an authorized hand-held device based on the identification data;
an imaging assembly supported on the vehicle to obtain an image of the ground surface condition;
an image processor to process the image to detect the condition on the ground surface, the control logic being operative to generate a display command signal; and
a display device operative to, responsive to the display command signal, display an actual image of the detected condition onto the vehicle above the ground surface for viewing of the detected condition in the presence of any detected condition or display an actual image of a welcome mat onto or adjacent the vehicle in the absence of any detected condition, the display being performed above the ground surface for viewing by an approaching pedestrian when the pedestrian carrying the authorized hand-held device is located within the predetermined range.

* * * * *